US012770565B2

(12) United States Patent
Son et al.

(10) Patent No.: US 12,770,565 B2
(45) Date of Patent: Oct. 20, 2026

(54) SUB-PIXEL AND DISPLAY DEVICE INCLUDING THE SAME AND ELECTRONIC DEVICE INCLUDING THE SAME

(71) Applicant: Samsung Display Co., Ltd., Yongin-Si (KR)

(72) Inventors: Sung Min Son, Yongin-si (KR); Geum Ju Moon, Yongin-si (KR); Won Jun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/085,087

(22) Filed: Mar. 20, 2025

(65) Prior Publication Data

US 2025/0391359 A1 Dec. 25, 2025

(30) Foreign Application Priority Data

Jun. 20, 2024 (KR) ........................ 10-2024-0080168
Aug. 13, 2024 (KR) ........................ 10-2024-0108383

(51) Int. Cl.
*G09G 3/3233* (2016.01)
*G09G 3/32* (2016.01)
*G09G 3/3266* (2016.01)

(52) U.S. Cl.
CPC ......... *G09G 3/3233* (2013.01); *G09G 3/3266* (2013.01); *G09G 3/32* (2013.01); *G09G 2300/0819* (2013.01); *G09G 2300/0842* (2013.01); *G09G 2300/0857* (2013.01); *G09G 2310/08* (2013.01)

(58) Field of Classification Search
CPC ...... G09G 3/3233; G09G 3/3266; G09G 3/32; G09G 2300/0819; G09G 2300/0842; G09G 2300/0857; G09G 2310/08
See application file for complete search history.

(56) References Cited

U.S. PATENT DOCUMENTS 10,861,393 B2 12/2020 Kim et al.
11,842,685 B2 12/2023 Kim et al.
2011/0090202 A1* 4/2011 Han .................... G09G 3/3233 345/76
2011/0141000 A1* 6/2011 Han .................... G09G 3/3233 345/82

(Continued)

FOREIGN PATENT DOCUMENTS

KR 102462008 B1 11/2022
KR 1020230098476 A 7/2023

(Continued)

*Primary Examiner* — Afroza Chowdhury
(74) *Attorney, Agent, or Firm* — Innovation Counsel LLP

(57) ABSTRACT

A sub-pixel is disclosed that includes first, second, and third transistors, and a light emitting element. The first transistor is connected between a first node that receives a first driving power and a second node to generate a driving current and includes a control electrode connected to a third node. The second transistor is connected between a data line and the first node and turned on in response to a first scan signal. The third transistor is connected between the second node and the third node and turned on in response to the first scan signal. The light emitting element receives the driving current to emit light.

12 Claims, 8 Drawing Sheets

(56) References Cited

U.S. PATENT DOCUMENTS

| | | | | |
|---|---|---|---|---|
| 2016/0140900 | A1* | 5/2016 | Yang .................... | G09G 3/3258<br>345/206 |
| 2020/0013338 | A1* | 1/2020 | Kang .................... | G09G 3/3233 |
| 2020/0175912 | A1* | 6/2020 | Lee ...................... | G09G 3/3233 |
| 2020/0302875 | A1* | 9/2020 | Park ..................... | G09G 3/3266 |
| 2021/0375201 | A1* | 12/2021 | Park ..................... | G09G 3/3233 |
| 2022/0309998 | A1* | 9/2022 | Lim ...................... | G09G 3/3266 |
| 2023/0044555 | A1* | 2/2023 | Bong .................... | G09G 3/3266 |
| 2023/0209901 | A1 | 6/2023 | Lhee et al. | |
| 2023/0290287 | A1 | 9/2023 | Kim et al. | |
| 2024/0177677 | A1* | 5/2024 | Kim ...................... | G09G 3/3233 |

FOREIGN PATENT DOCUMENTS

| | | | |
|---|---|---|---|
| KR | 1020230110412 | A | 7/2023 |
| KR | 1020230134066 | A | 9/2023 |

* cited by examiner

SUB-PIXEL AND DISPLAY DEVICE INCLUDING THE SAME AND ELECTRONIC DEVICE INCLUDING THE SAME

CROSS-REFERENCE TO RELATED APPLICATION

This application claims priority to and the benefit of Korean Patent Application No. 10-2024-0080168 filed in the Korean Intellectual Property Office on Jun. 20, 2024, and Korean Patent Application No. 10-2024-0108383 filed in the Korean Intellectual Property Office on Aug. 13, 2024 the entire contents of which are incorporated herein by reference.

BACKGROUND

(a) Field of the Invention

The present disclosure relates to a sub-pixel, a display device including the same, and an electronic device including the same.

(b) Description of the Related Art

As information technology has developed, the importance of display devices, which are connection mediums between users and information, has been highlighted. Accordingly, the use of display devices such as liquid crystal display devices, organic light emitting display devices, and the like has increased.

Recently, a head mounted display device (HMD) has been developed. A head mounted display device is a display device that a user wears in the form of glasses or a helmet to implement virtual reality (VR) or augmented reality (AR) that focuses on a distance close to the eyes. A display device capable of reducing the size of a dead space area in which a scan driver is disposed may be beneficial to head mounted display devices as well as other electronic devices.

SUMMARY

The present disclosure may provide a sub-pixel that reduces the size of a dead space area, a display device including the same, and an electronic device including the same.

An embodiment of a sub-pixel includes: a first transistor that is connected between a first node that receives a first driving power and a second node to generate a driving current and includes a control electrode connected to a third node; a second transistor connected between a data line and the first node and turned on in response to a first scan signal; a third transistor connected between the second node and the third node and turned on in response to the first scan signal; and a light emitting element that receives the driving current to emit light.

Each of the second transistor and the third transistor may be an NMOS transistor.

The sub-pixel may further include a fourth transistor connected between the third node and a first power line providing a first initialization power and turned on in response to the second scan signal.

The sub-pixel may further include a fifth transistor connected between the first node and a second power line that provides a voltage of the first driving power and turned on in response to an emission control signal; and a sixth transistor connected between the second node and a fourth node and turned on in response to the emission control signal, wherein the light emitting element may be connected between the fourth node and a third power line that provides a second driving power.

The sub-pixel may further include a seventh transistor connected between the fourth node and a fourth power line that provides a voltage of a second initialization power and turned on in response to a third scan signal; and an eighth transistor connected between the first node and a fifth power line that provides a voltage of a bias power and turned on in response to the third scan signal.

Each of the second transistor, the third transistor, and the fourth transistor may be an NMOS transistor, and each of the first transistor, the fifth transistor, the sixth transistor, the seventh transistor, and the eighth transistor may be a PMOS transistor.

In operation, a frame may include a non-emission period and an emission period; the non-emitting period may include a first period, a second period, and a third period; in the first period, the second scan signal may have a high logic level; in the second period after the first period, the first scan signal may have a high logic level; and in the third period after the second period, the third scan signal may have a low logic level.

An embodiment of a display device includes: a sub-pixel that includes a first transistor and a light emitting element, the first transistor is connected between a first node that receives a first driving power and a second node to generate a driving current, the first transistor includes a control electrode connected to a third node, the sub-pixel is connected to a first scan line, an emission control line, and a data line; an emission driver supplying an emission control signal to the emission control line; a first scan driver supplying a first scan signal to the first scan line; and a data driver supplying a data signal to the data line, wherein the first scan signal controls a timing at which the data signal is supplied to the first node and a timing at which the second node and the third node are connected.

The sub-pixel may further include a second transistor connected between the data line and the first node and turned on in response to the first scan signal; a third transistor connected between the second node and the third node and turned on in response to the first scan signal; and the light emitting element that receives the driving current to emit light.

Each of the second transistor and the third transistor may be an NMOS transistor.

The display device may further include a second scan driver that supplies a second scan signal to the second scan line, wherein the sub-pixel may further include a fourth transistor connected between the third node and a first power line that provides a first initialization power and turned on in response to the second scan signal.

The sub-pixel may further include a fifth transistor connected between the first node and a second power line that provides a voltage of the first driving power and turned on in response to the emission control signal; and a sixth transistor connected between the second node and a fourth node and turned on in response to the emission control signal, and the light emitting element may be connected between the fourth node and a third power line that provides a second driving power.

The display device may further include a third scan driver that supplies a third scan signal to a third scan line, wherein the sub-pixel may further include a seventh transistor connected between the fourth node and a fourth power line that provides a voltage of a second initialization power and turned on in response to the third scan signal; and an eighth transistor connected between the first node and a fifth power line that provides a voltage of a bias power and turned on in response to the third scan signal.

Each of the second transistor, the third transistor, and the fourth transistor may be an NMOS transistor, and each of the first transistor, the fifth transistor, the sixth transistor, the seventh transistor, and the eighth transistor may be a PMOS transistor.

An embodiment of an electronic device includes: a processor to provide input image data; and a display device to display an image based on the input image data, wherein the display device comprising a sub-pixel that includes a first transistor and a light emitting element, the first transistor is connected between a first node that receives a first driving power and a second node to generate a driving current, the first transistor includes a control electrode connected to a third node, the sub-pixel is connected to an i-th first scan line, an (i−1)-th first scan line, an i-th emission control line, and a j-th data line; an emission driver that supplies an i-th emission control signal to the i-th emission control line; a first scan driver that supplies an i-th first scan signal to the i-th first scan line and an (i−1)-th first scan signal to the (i−1)-th first scan line; and a data driver that supplies a data signal to the j-th data line, wherein the i-th first scan signal controls a timing at which the data signal is supplied to the first node and a timing at which the second node and the third node are connected, and i and j are natural numbers.

The sub-pixel further includes a second transistor connected between the j-th data line and the first node and turned on in response to the i-th first scan signal; a third transistor connected between the second node and the third node and turned on in response to the i-th first scan signal; and the light emitting element that receives the driving current to emit light.

The sub-pixel further includes a fourth transistor connected between the third node and a first power line that provides a first initialization power and turned on in response to the (i−1)-th first scan signal.

The sub-pixel further includes a fifth transistor connected between the first node and a second power line that provides a voltage of the first driving power and turned on in response to the i-th emission control signal; and a sixth transistor connected between the second node and a fourth node and turned on in response to the i-th emission control signal, and the light emitting element is connected between the fourth node and a third power line that provides a second driving power.

The electronic device further includes a second scan driver that supplies an i-th second scan signal to an i-th second scan line, wherein the sub-pixel further includes a seventh transistor connected between the fourth node and a fourth power line that provides a voltage of a second initialization power and turned on in response to the i-th second scan signal; and an eighth transistor connected between the first node and a fifth power line that provides a voltage of a bias power and turned on in response to the i-th second scan signal.

Each of the second transistor, the third transistor, and the fourth transistor is an NMOS transistor, and each of the first transistor, the fifth transistor, the sixth transistor, the seventh transistor, and the eighth transistor is a PMOS transistor.

According to the display device of the embodiments of the present disclosure, by integrating a scan driver that controls a transistor included in a sub-pixel, the size of the area in which the scan driver is disposed may be reduced.

However, the effects of the present disclosure are not limited to the above-described effects, and may be variously extended without departing from the spirit and scope of the present disclosure.

DETAILED DESCRIPTION OF THE EMBODIMENTS

Figure 1:
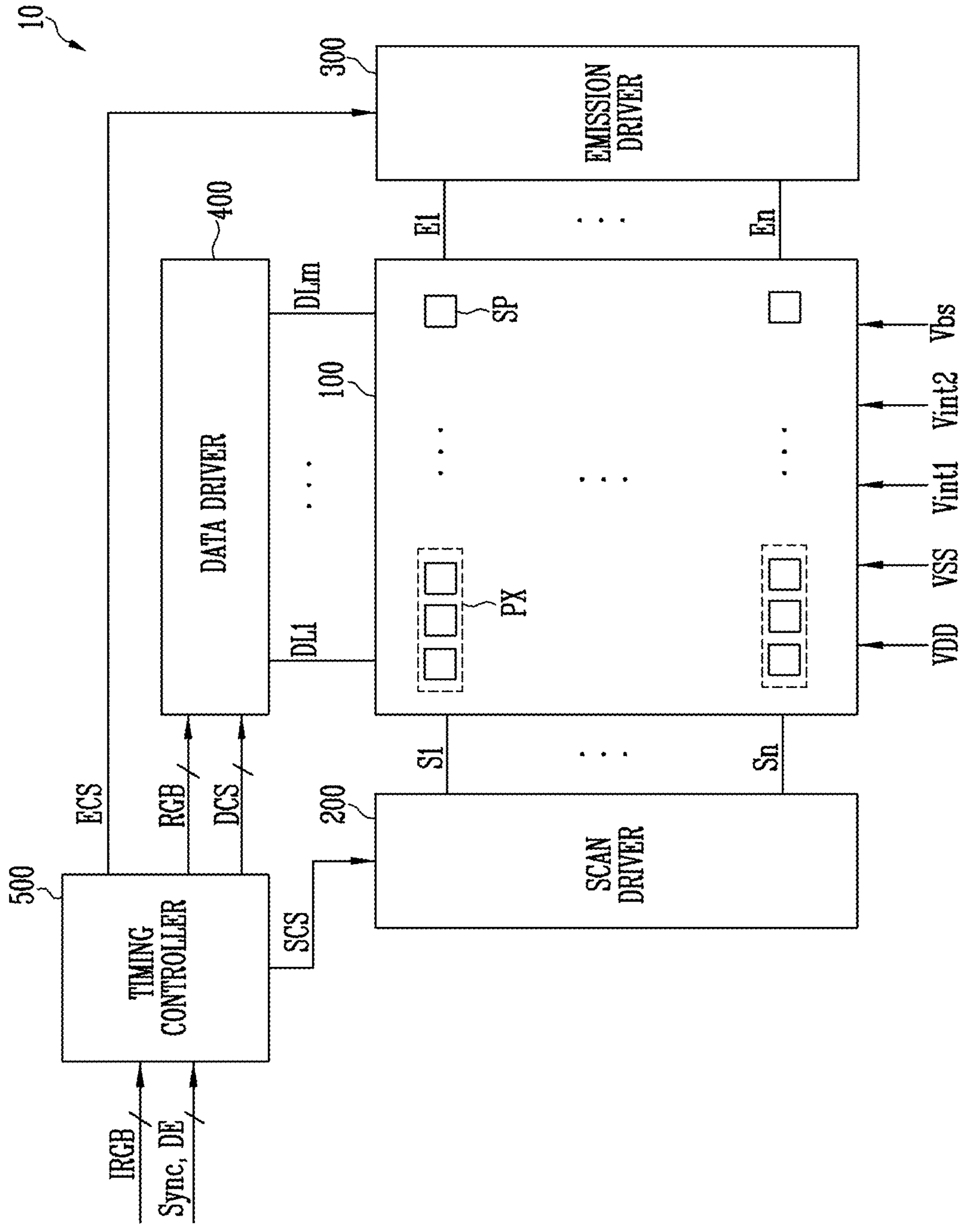
FIG. 1 illustrates a display device according to embodiments of the present disclosure.

The present disclosure will be described more fully hereinafter with reference to the accompanying drawings, in which embodiments of the disclosure are shown. As those skilled in the art would realize, the described embodiments may be modified in various different ways, all without departing from the spirit and scope of the present disclosure.

In the drawings, parts or portion unrelated to the present disclosure are omitted to clarify the description of the present disclosure, and like reference numerals designate like constituent elements throughout the specification.

Throughout the specification, when it is described that an element is "connected" to another element, this includes not only being "directly connected", but also being "indirectly connected" with another device in between. The terms used herein are for the purpose of describing specific embodiments and are not intended to limit the scope of the invention. Throughout the specification, unless explicitly described to the contrary, the words "comprise" and "include" (as well as variations such as "comprises" or "comprising") will be understood to imply the inclusion of stated elements but not the exclusion of any other elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

Although the terms first, second, etc. may be used herein to describe various constituent elements, these constituent elements should not be limited by these terms. These terms are used to distinguish a constituent element from another. Thus, a first constituent element discussed below could be termed a second constituent element without departing from the teachings of the present disclosure.

FIG. 1 illustrates a display device according to embodiments of the present disclosure.

A display device 10 may display images at various frame frequencies (refresh rate, driving frequency, or screen refresh rate) depending on operating conditions. The frame frequency is a frequency at which a data voltage is substantially written to a driving transistor of a pixel PX for one second. For example, the frame frequency is also referred to as a screen refresh rate or a screen refresh frequency, and represents a frequency at which a display screen is played for one second.

In embodiments, the display device 10 may adjust an output frequency of a scan driver 200 and an emission driver 300 and an output frequency of a data driver 400 corresponding thereto according to the driving conditions. For example, the display device 10 may display an image corresponding to various frame frequencies of 1 Hz to 120 Hz. However, this is an example, and the display device 10 may display an image at a frame frequency (for example, 240 Hz or 480 Hz) of 120 Hz or higher.

The display device 10 may include a display panel 100, the scan driver 200, the emission driver 300, the data driver 400, and a timing controller 500.

The display panel 100 may include a display area in which the pixels PX are disposed and a non-display area disposed in a peripheral area (for example, an edge area) of the display area. The pixels PX may be disposed in the display area. A component for controlling the pixels PX may be disposed in the non-display area. For example, wires connected to sub-pixels SP, such as first to n-th scan lines S1 to Sn and first to m-th data lines DL1 to DLm, may be disposed in the non-display area.

At least one of the scan driver 200, the emission driver 300, the data driver 400, and the timing controller 500 may be disposed in the non-display area of the display panel 100.

Each of the pixels PX may include a plurality of sub-pixels SP. Each of sub-pixels SP of the plurality of sub-pixels SP may emit light of a color. For example, the pixel PX may include a red sub-pixel SP that emits red light (for example, a first color), a green sub-pixel SP that emits green light (for example, a second color), and a blue sub-pixel SP that emits blue light (for example, a third color). However, the color emitted by the sub-pixel SP and the type or number of the sub-pixels SP are not limited thereto.

According to the embodiment, the sub-pixels SP may be arranged according to a stripe or pentile (PENTILE®) arrangement structure, but the present disclosure is not limited thereto, and various examples may be applied to the present disclosure.

The timing controller 500 may receive input image data IRGB and control signals Sync and DE from a host system such as an application processor (AP) through a predetermined interface.

The timing controller 500 may generate a first control signal SCS, a second control signal ECS, and a third control signal DCS based on the input image data IRGB, the synchronization signal Sync (for example, a vertical synchronization signal, a horizontal synchronization signal, and the like), a data enable signal DE, and a clock signal. The first control signal SCS may be supplied to the scan driver 200, the second control signal ECS may be supplied to the emission driver 300, and the third control signal DCS may be supplied to the data driver 400. The timing controller 500 may rearrange the input image data IRGB to supply it to the data driver 400.

The scan driver 200 may receive the first control signal SCS from the timing controller 500, and may supply scan signals to scan lines S1 to Sn based on the first control signal SCS.

The scan signals may be set to a gate-on level corresponding to the type of transistor to which the corresponding scan signals are supplied. The transistor receiving the scan signal may be set to a turn-on state when the scan signal is supplied. For example, the gate-on voltage of the scan signal supplied to the P-channel metal oxide semiconductor (PMOS) transistor may be at a logical low level, and the gate-on voltage of the scan signal supplied to the N-channel metal oxide semiconductor (NMOS) transistor may be at a logical high level. Hereinafter, the meaning of "the scan signal is supplied" may be understood that the scan signal is supplied at a logic level for turning on the transistor controlled by the scan signal.

The emission driver 300 may supply an emission control signal to the emission control lines E1 to En based on the second control signal ECS. For example, the emission control signal may be sequentially supplied to the emission control lines E1 to En.

The emission control signal may be set to a gate-off voltage (for example, a high voltage). The transistor receiving the emission control signal is turned off when the emission control signal is supplied, and may be set to a turn-on state in other cases. Hereinafter, the meaning of "the emission control signal is supplied" may be understood as the emission control signal being supplied at a logic level that turns off the transistor controlled by it.

In FIG. 1, for better understanding and ease of description, each of the scan driver 200 and the emission driver 300 is shown as a single configuration, but the present disclosure is not limited thereto. In addition, at least one of the scan driver 200 and the emission driver 300 may be integrated into one driving circuit, module, or the like.

The data driver 400 may receive the third control signal DCS and the image data RGB from the timing controller 500. The data driver 400 may convert the digital image data RGB into an analog data signal (data voltage). The data driver 400 may supply a data signal to the data lines DL1 to DLm in response to the third control signal DCS.

In embodiments, the display device 10 may further include a power supply. The power supply may supply the voltage of the first driving power VDD, the voltage of the second driving power VSS, the voltage of the first power Vint1 (or the first initialization power), the voltage of the second power Vint2 (or the second initialization power), and the voltage of the third power Vbs (or the bias power) for driving the pixel PX to the display panel 100.

Figure 2:
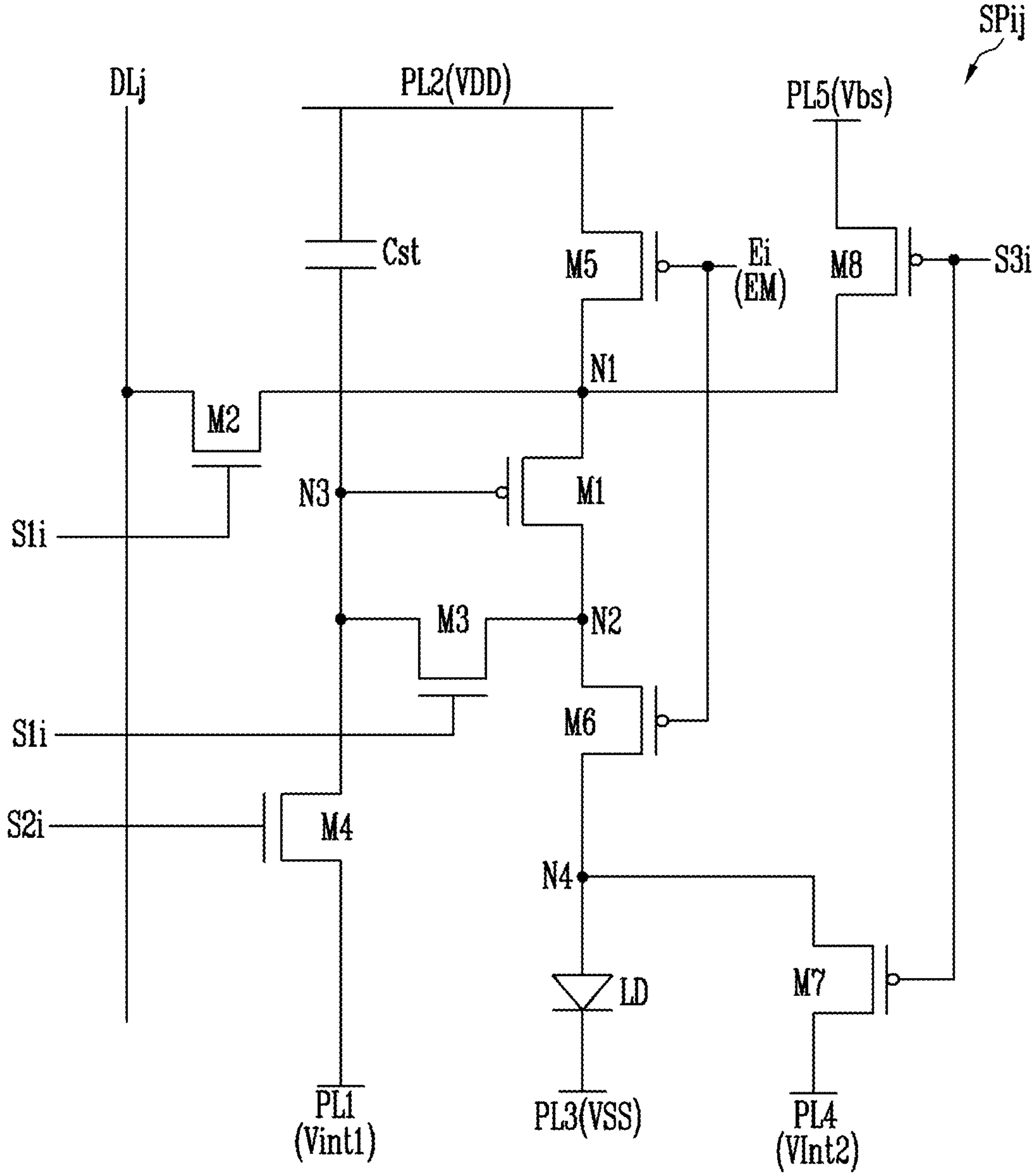
FIG. 2 is a circuit diagram that illustrates an embodiment of a sub-pixel.

FIG. 2 is a circuit diagram that illustrates an embodiment of a sub-pixel.

In FIG. 2, for better comprehension and ease of description, a sub-pixel SPij disposed on an i-th horizontal line (or an i-th pixel row) and connected to a j-th data line DLj is illustrated (wherein, i and j are natural numbers).

Referring to FIG. 1 and FIG. 2, the sub-pixel SPij may include a light emitting element LD, first to eighth transistors M1 to M8, and a storage capacitor Cst.

A first electrode (anode electrode or cathode electrode) of the light emitting element LD may be connected to the sixth transistor M6, and a second electrode (cathode electrode or anode electrode) thereof may be connected to a third power line PL3 that provides the second driving power VSS. The light emitting element LD may generate light with a predetermined luminance corresponding to the amount of current supplied from a first transistor M1.

In an embodiment, the light emitting element LD may be an organic light emitting diode including an organic light emitting layer. In an embodiment, the light emitting element LD may be an inorganic light emitting element made of an inorganic material. In an embodiment, the light emitting element LD may be a light emitting element complexly made of an inorganic material and an organic material. The light emitting element LD may have a form in which a plurality of inorganic light emitting elements are connected in parallel or in series between the second driving power VSS and the sixth transistor M6.

A first electrode of the first transistor M1 (or driving transistor) may be connected to a first node N1, and a second electrode thereof may be connected to a second node N2. A gate electrode of the first transistor M1 may be connected to a third node N3. The first node N1 may receive the first driving power VDD through the fifth transistor M5.

The first transistor M1 may control the amount of current flowing from the first driving power VDD to the second driving power VSS via the light emitting element LD in response to the voltage of the third node N3. To this end, the first driving power VDD may be set to a voltage higher than the second driving power VSS.

The second transistor M2 may be connected between the j-th data line DLj (hereinafter referred to as a data line) and the first node N1. A gate electrode of the second transistor M2 may be connected to an i-th first scan line S11 (hereinafter, referred to as a first scan line). The second transistor M2 may be turned on when the first scan signal is supplied to the first scan line S11 to electrically connect the data line DLj and the first node N1.

That is, the timing at which the data signal is provided to the first node N1 may be controlled by the first scan signal provided to the first scan line S11.

The third transistor M3 may be connected between the second electrode of the first transistor M1 (the second node N2) and the third node N3. A gate electrode of the third transistor M3 may be connected to the first scan line S11. The third transistor M3 may be turned on when the first scan signal is supplied to the first scan line S11 to electrically connect the second electrode of the first transistor M1 (the second node N2) and the third node N3.

The timing at which the second electrode (for example, the drain electrode) of the first transistor M1 and the gate electrode of the first transistor M1 are connected may be controlled by the first scan signal provided to the first scan line S11. When the third transistor M3 is turned on, the first transistor M1 may be diode-connected.

The fourth transistor M4 may be connected between the third node N3 and the first power line PL1 providing the first power Vint1 (hereinafter referred to as the first initialization power)

A gate electrode of the fourth transistor M4 may be connected to an i-th second scan line S2*i* (hereinafter, referred to as a second scan line).

When the second scan signal is supplied to the second scan line S2*i*, the fourth transistor M4 may be turned on to supply the voltage of the first initialization power Vint1 to the third node N3. Here, the voltage of the first initialization power Vint1 may be set to a voltage lower than the lowest level of the data signal supplied to the data line DLj.

Accordingly, the gate voltage of the first transistor M1 may be initialized to the voltage of the first initialization power source Vint1 by the turn-on of the fourth transistor M4.

The fifth transistor M5 may be connected between the second power line PL2 providing the first driving power VDD and the first node N1. A gate electrode of the fifth transistor M5 may be connected to an i-th emission control line Ei, (hereinafter, referred to as an emission control line). The fifth transistor M5 is turned off when an emission control signal EM is supplied to the emission control line Ei, and is turned on in other cases.

When the fifth transistor M5 is turned on, the voltage of the first driving power VDD may be supplied to the first node N1.

The sixth transistor M6 may be connected between the second electrode of the first transistor M1 (the second node N2) and the first electrode of the light emitting element LD (the fourth node N4). A gate electrode of the sixth transistor M6 may be connected to the emission control line Ei. The sixth transistor M6 may be controlled substantially in the same manner as the fifth transistor M5.

The seventh transistor M7 may be connected between the first electrode of the light emitting element LD (the fourth node N4) and the fourth power line PL4 providing the second power Vint2 (hereinafter, referred to as the second initialization power). In embodiments, a gate electrode of the seventh transistor M7 may be connected to an i-th third scan line S3*i* (hereinafter, referred to as a third scan line).

The seventh transistor M7 may be turned on when the third scan signal is supplied to the third scan line S3*i* to supply the voltage of the second initialization power Vint2 to the first electrode of the light emitting element LD.

The eighth transistor M8 may be connected between the first node N1 and the fifth power line PL5 that provides a voltage of the third power Vbs. The eighth transistor M8 may be turned on in response to the third scan signal supplied to the third scan line S3*i*, and may supply the voltage of the third power Vbs to the first node N1. Here, the timing at which the voltage of the third power Vbs is supplied to the first node N1 may be controlled by the third scan signal.

In embodiments, the voltage of the third power Vbs may be less than the voltage of the first driving power VDD and may be greater than the voltage of the second driving power VSS.

Accordingly, a predetermined voltage may be applied to the first electrode (for example, the source electrode) of the first transistor M1 by the turn-on of the eighth transistor M8. In this case, when the third transistor M3 is in a turn-off state, the first transistor M1 may have an on-bias state (a state in which it may be turned on, which may be referred to as on-biased).

The storage capacitor Cst may be connected between the second power line PL2 and the third node N3. The storage capacitor Cst may store the voltage applied to the third node N3.

In embodiments, the first transistor M1, the fifth transistor M5, the sixth transistor M6, the seventh transistor M7, and the eighth transistor M8 may be formed as polysilicon semiconductor transistors. For example, the first transistor M1, the fifth transistor M5, the sixth transistor M6, the seventh transistor M7, and the eighth transistor M8 may include a polysilicon semiconductor layer formed through a low temperature poly-silicon (LTPS) process as an active layer (which may be referred to as a channel).

In addition, the first transistor M1, the fifth transistor M5, the sixth transistor M6, the seventh transistor M7, and the eighth transistor M8 may be P-type transistors (for example, PMOS transistors). Accordingly, the gate-on voltage for turning on the first transistor M1, the fifth transistor M5, the sixth transistor M6, the seventh transistor M7, and the eighth transistor M8 may be at a low logic level.

The second transistor M2, the third transistor M3, and the fourth transistor M4 may be formed as oxide semiconductor transistors. For example, the second transistor M2, the third transistor M3, and the fourth transistor M4 may be N-type oxide semiconductor transistors (for example, NMOS transistors) and may include an oxide semiconductor layer as an active layer. Accordingly, the gate-on voltage for turning on the second transistor M2, the third transistor M3, and the fourth transistor M4 may be at a high logic level.

Since the gate-on voltages for turning on the second transistor M2 and the third transistor M3 are the same at a high logic level, they may be controlled by a signal (for example, the first scan signal). Accordingly, the turn-on periods of the second transistor M2 and the third transistor M3 may be the same.

In addition, since the second transistor M2 is formed as an NMOS transistor, the leakage current caused by the second transistor M2 may be reduced compared to the case in which the second transistor M2 is formed as a PMOS transistor.

Figure 3:
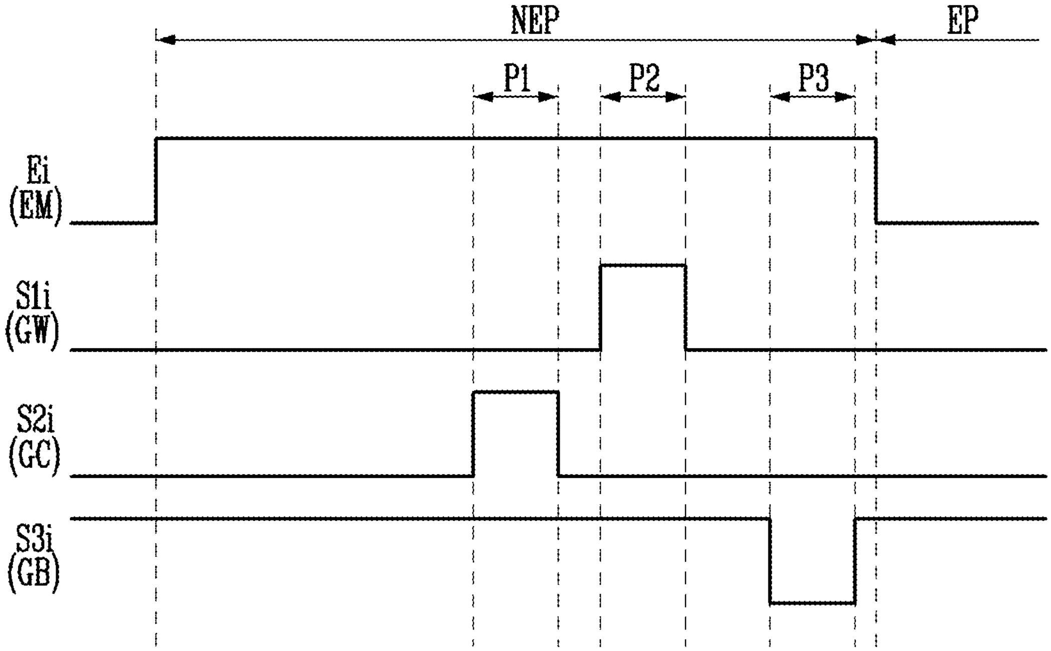
FIG. 3 is a timing diagram of an example of signals supplied to a pixel during a frame period.

FIG. 3 is a timing diagram of an example of signals supplied to a pixel.

Referring to FIG. 3, a frame may include a non-emission period NEP and an emission period EP. For example, the light emitting element LD may emit light during the emission period EP. The non-emission period NEP may include a first period P1, a second period P2, and a third period P3.

During the non-emission period NEP, the emission control signal EM may be supplied to the emission control line Ei. Accordingly, the fifth transistor M5 and the sixth transistor M6 may be turned off during the non-emission period NEP.

During the first period P1, the scan driver 200 may supply the second scan signal GC to the second scan line S2*i*. As the second scan signal GC is supplied, the fourth transistor M4 may be turned on. Thus, the gate voltage of the first transistor M1 may be initialized to the voltage of the first initialization power Vint1.

In the second period P2, the scan driver 200 may supply the first scan signal GW to the first scan line S11. As the first scan signal GW is supplied, the second transistor M2 and the third transistor M3 may be turned on. Accordingly, since the data signal supplied to the data line DLj is supplied to the first node N1 and the first transistor M1 is diode-connected, data writing and threshold voltage compensation of the first transistor M1 may be performed.

The period during which the second transistor M2 and the third transistor M3 are turned on may be the second period P2. That is, the threshold voltage compensation operation of the first transistor M1 may not be performed after data writing. Accordingly, defects that might occur due to the threshold voltage compensation of the first transistor M1 after data writing may be avoided.

In the third period P3, the scan driver 200 may supply a third scan signal to the third scan line S3*i*. As the third scan signal is supplied, the seventh transistor M7 and the eighth transistor M8 may be turned on.

The voltage of the third power Vbs may be supplied to the first node NI by the turn-on of the seventh transistor M7. The voltage of the third power Vint2 may be supplied to the fourth node N4 by the turn-on of the eighth transistor M8.

Thereafter, the emission driver 300 may stop supplying the emission control signal to the emission control line Ei during the emission period EP. Accordingly, the fifth and sixth transistors M5 and M6 may be turned on, and a driving current based on the data signal may be supplied to the light emitting element LD through the first transistor M1. The light emitting element LD may emit light with luminance corresponding to the driving current.

Figure 4:
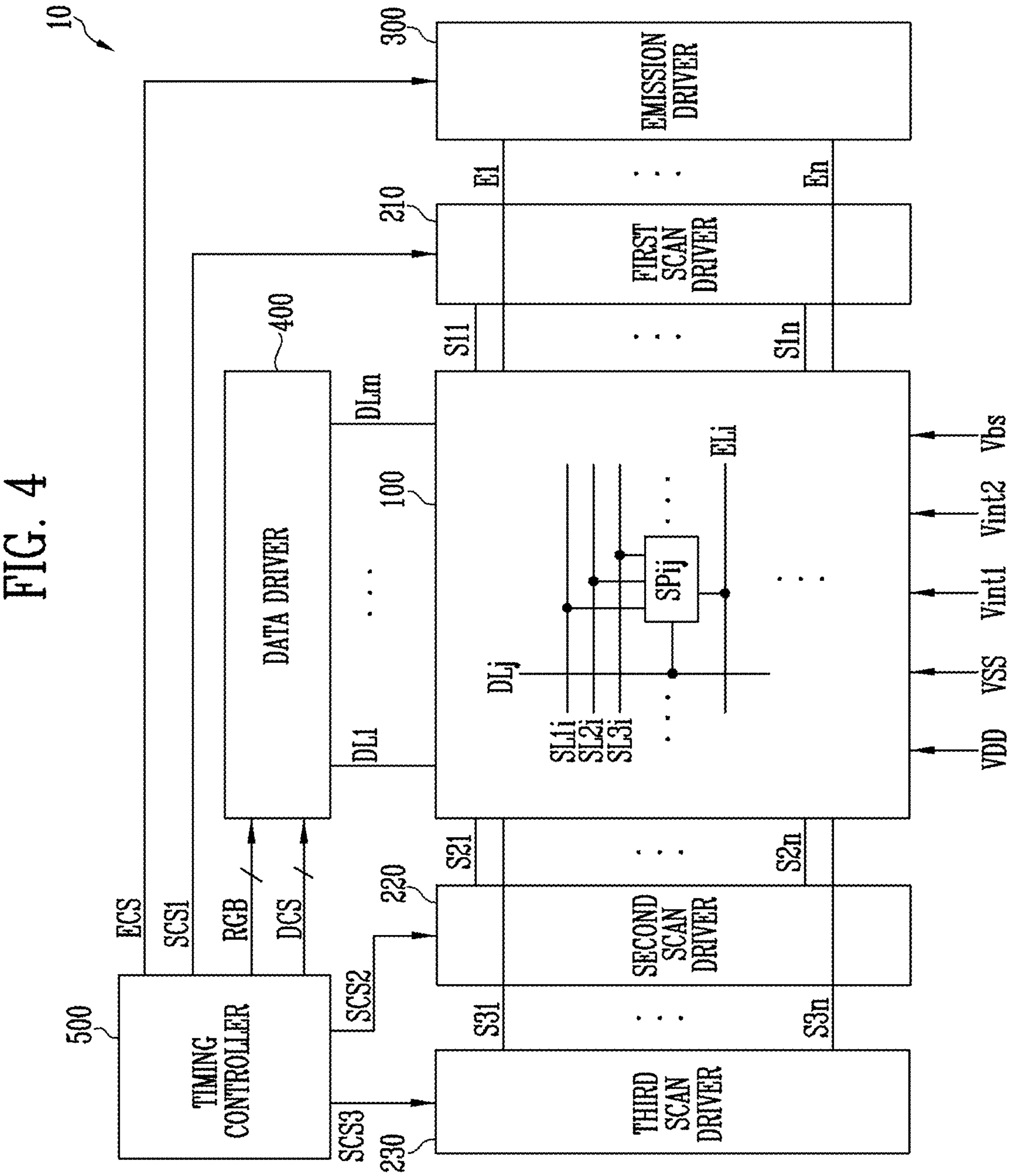
FIG. 4 illustrates a display device according to embodiments of the present disclosure.

FIG. 4 illustrates a display device according to embodiments of the present disclosure.

Referring to FIG. 1 and FIG. 4, the scan driver 200 may include a first scan driver 210, a second scan driver 220, and a third scan driver 230. The display panel 100, the emission driver 300, and the data driver 400 of FIG. 1 are similar to the display panel 100, the emission driver 300, and the data driver 400 of FIG. 4, so a duplicate description may be omitted.

The timing controller 500 may generate a first scan control signal SCS1, a second scan control signal SCS2, and a third scan control signal SCS3.

The first scan control signal SCS1 may be supplied to the first scan driver 210, the second scan control signal SCS2 may be supplied to the second scan driver 220, and the third scan control signal SCS3 may be supplied to the third scan driver 230.

The first scan control signal SCS1 may include a first scan start pulse and clock signals. The first scan start pulse may control a first timing of the scan signal output from the first scan driver 210. The clock signals may be used to shift the first scan start pulse.

The second scan control signal SCS2 may include a second scan start pulse and clock signals. The second scan start pulse may control a first timing of the scan signal output from the second scan driver 220. The clock signals may be used to shift the second scan start pulse.

The third scan control signal SCS3 may include a third scan start pulse and clock signals. The third scan start pulse may control a first timing of the scan signal output from the third scan driver 230. The clock signals may be used to shift the third scan start pulse.

The first scan driver 210 may receive the first scan control signal SCS1 from the timing controller 500 and supply a scan signal (for example, a first scan signal) to the first scan lines S11 to Sin based on the first scan control signal SCS1.

For example, the first scan driver 210 may sequentially supply the first scan signal to the first scan lines S11 to S1*n*. When the first scan signal is sequentially supplied, the sub-pixels SP are selected in horizontal line units (or pixel row units), and data signals may be supplied to the sub-pixels SP. That is, the first scan signal may be a signal used for data writing.

Referring to FIG. 2, the second transistor M2 and the third transistor M3 receiving the first scan signal may be set to a turn-on state when the first scan signal is supplied.

That is, rather than the second transistor M2 and the third transistor M3 being individually controlled by separate scan drivers, the second transistor M2 and the third transistor M3 may be integrated and controlled by a single first scan driver 210.

Accordingly, the number of required scan drivers is reduced, so that the non-display area (for example, dead space) in which the scan driver is disposed may be reduced.

The second scan driver 220 may receive the second scan control signal SCS2 from the timing controller 500 and supply a scan signal (for example, a second scan signal) to the second scan lines S21 to S2*n* based on the second scan control signal SCS2.

For example, the second scan driver 220 may sequentially supply the second scan signal to the second scan lines S21 to S2*n*. When the second scan signal is supplied, the sub-pixels SP may perform threshold voltage compensation.

Referring to FIG. 2, the fourth transistor M4 receiving the second scan signal may be set to a turn-on state when the second scan signal is supplied.

The third scan driver 230 may receive the third scan control signal SCS3 from the timing controller 500 and supply a scan signal (for example, a third scan signal) to the third scan lines S31 to S3*n* based on the third scan control signal SCS3. For example, the third scan driver 230 may sequentially supply the third scan signal to the third scan lines S31 to S3*n*.

Referring to FIG. 2, the seventh and eighth transistors M7 and M8 receiving the third scan signal may be set to a turn-on state when the third scan signal is supplied.

Figure 5:
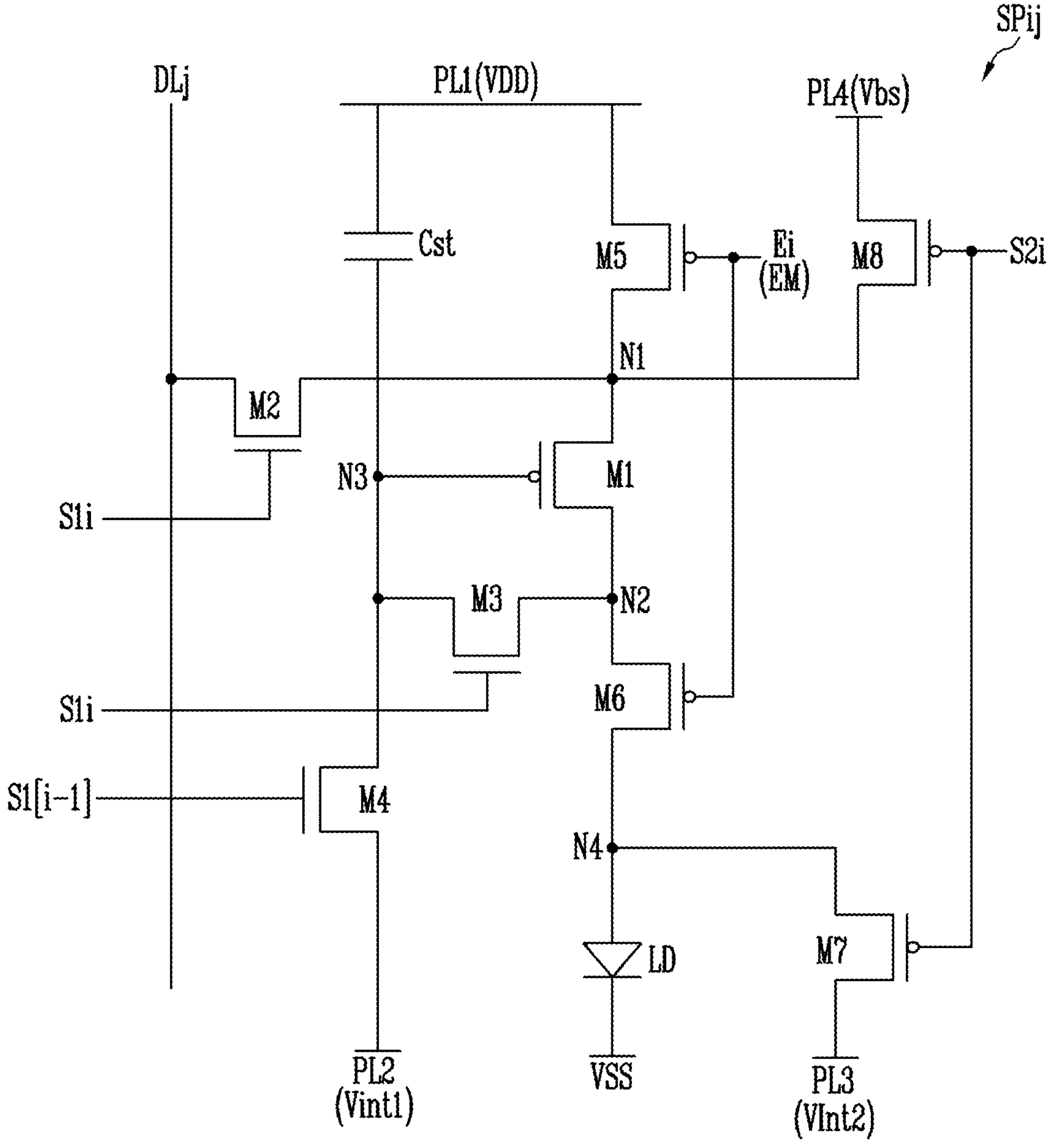
FIG. 5 is a circuit diagram that illustrates an embodiment of a sub-pixel.

FIG. 5 is a circuit diagram that illustrates an embodiment of a sub-pixel.

In FIG. 5, for better comprehension and ease of description, a sub-pixel SPij disposed on an i-th horizontal line (or an i-th pixel row) and connected to a j-th data line DLj is illustrated (wherein, i and j are natural numbers).

Referring to FIG. 5, the sub-pixel SPij may include a light emitting element LD, first to eighth transistors M1 to M8, and a storage capacitor Cst. Since the sub-pixel SPij of FIG. 5 is similar to the sub-pixel SPij of FIG. 2, redundant descriptions are omitted.

The second transistor M2 may be connected between the j-th data line DLj (hereinafter referred to as a data line) and the first node N1. A gate electrode of the second transistor M2 may be connected to the i-th first scan line S11. The second transistor M2 may be turned on when an i-th first scan signal GW[i] is supplied to the i-th first scan line S11 to electrically connect the data line DLj and the first node N1.

The third transistor M3 may be connected between the second electrode of the first transistor M1 (the second node N2) and the third node N3. A gate electrode of the third transistor M3 may be connected to the i-th first scan line S11. The third transistor M3 may be turned on when the i-th first scan signal GW[i] is supplied to the i-th first scan line S11 to electrically connect the second electrode of the first transistor M1 and the third node N3.

The fourth transistor M4 may be connected between the third node N3 and the first power line PL1 providing the first initialization power Vint1. A gate electrode of the fourth transistor M4 may be connected to the (i−1)-th first scan line S1[*i*−1].

That is, the gate electrode of the fourth transistor M4 may be controlled in the same manner as the second and third transistors M2 and M3 of the sub-pixel disposed in the (i−1)-th horizontal line (or the (i−1)-th pixel row).

When the (i−1)-th first scan signal GW[i−1] is supplied to the (i−1)-th first scan line S1[*i*−1], the fourth transistor M4 may be turned on to supply the voltage of the first initialization power Vint1 to the third node N3.

Since the gate-on voltage for turning on the second to fourth transistors M2 to M4 is the same as the high logic level, the scan signal for controlling the second to fourth transistors M2 to M4 may be integrated into the first scan signal S1.

The fifth transistor M5 may be connected between the second power line PL2 providing the first driving power VDD and the first node N1. A gate electrode of the fifth transistor M5 may be connected to the i-th emission control line Ei. The fifth transistor M5 is turned off when the i-th emission control signal is supplied to the i-th emission control line Ei, and is turned on in other cases.

The sixth transistor M6 may be connected between the second electrode of the first transistor M1 (the second node N2) and the first electrode of the light emitting element LD (the fourth node N4). A gate electrode of the sixth transistor M6 may be connected to the i-th emission control line Ei. The sixth transistor M6 may be controlled substantially in the same manner as the fifth transistor M5.

The seventh transistor M7 may be connected between the first electrode of the light emitting element LD (the fourth node N4) and the fourth power line PL4 providing the second power Vint2. In embodiments, a gate electrode of the seventh transistor M7 may be connected to the i-th second scan line S2*i*.

The seventh transistor M7 may be turned on when the i-th second scan signal is supplied to the i-th second scan line S2*i* to supply the voltage of the second initialization power Vint2 to the first electrode of the light emitting element LD.

The eighth transistor M8 may be connected between the first node N1 and the fifth power line PL5 that provides a voltage of the third power Vbs. The eighth transistor M8 may be turned on in response to the i-th second scan signal supplied to the i-th second scan line S2*i*, and may supply the voltage of the third power Vbs to the first node N1.

Figure 6:
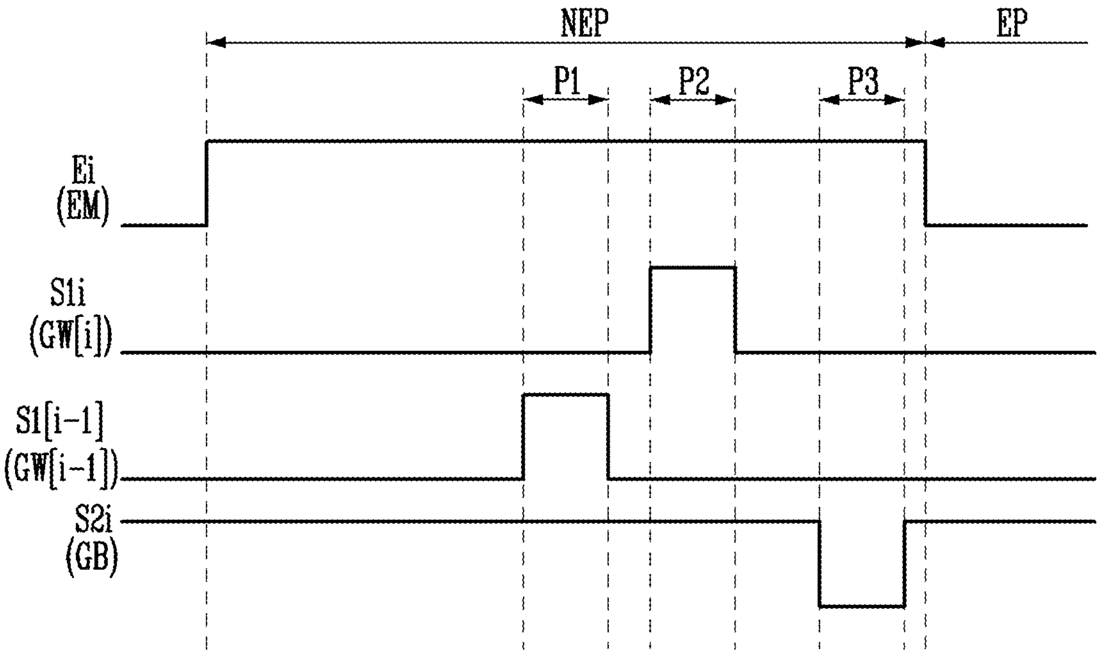
FIG. 6 is a timing diagram of an example of signals supplied to a pixel during a frame period.

FIG. 6 is a timing diagram of an example of signals supplied to a pixel during a frame period.

Referring to FIG. 6, a frame may include a non-emission period NEP and an emission period EP. For example, the light emitting element LD may emit light during the emission period EP. The non-emission period NEP may include a first period P1, a second period P2, and a third period P3.

The non-emission period NEP and the emission period EP of FIG. 6 are similar to the non-emission period NEP and the emission period EP of FIG. 5, so redundant descriptions are omitted.

During the non-emission period NEP, the emission control signal EM may be supplied to the emission control line Ei. Accordingly, the fifth transistor M5 and the sixth transistor M6 may be turned off during the non-emission period NEP.

In the first period P1, the scan driver 200 may supply the (i−1)-th first scan signal GW[i−1] to the (i−1)-th first scan line S1[*i*−1]. As the (i−1)-th first scan signal GW[i−1] is supplied, the fourth transistor M4 may be turned on. Thus, the gate voltage of the first transistor M1 may be initialized to the voltage of the first initialization power Vint1.

In the second period P2, the scan driver 200 may supply the i-th first scan signal GW[i] to the i-th first scan line S1[*i*]. As the i-th first scan signal GW[i] is supplied, the second transistor M2 and the third transistor M3 may be turned on. Accordingly, since the data signal supplied to the data line DLj is supplied to the first node N1 and the first transistor M1 is diode-connected, data writing and threshold voltage compensation of the first transistor M1 may be performed.

Figure 7:
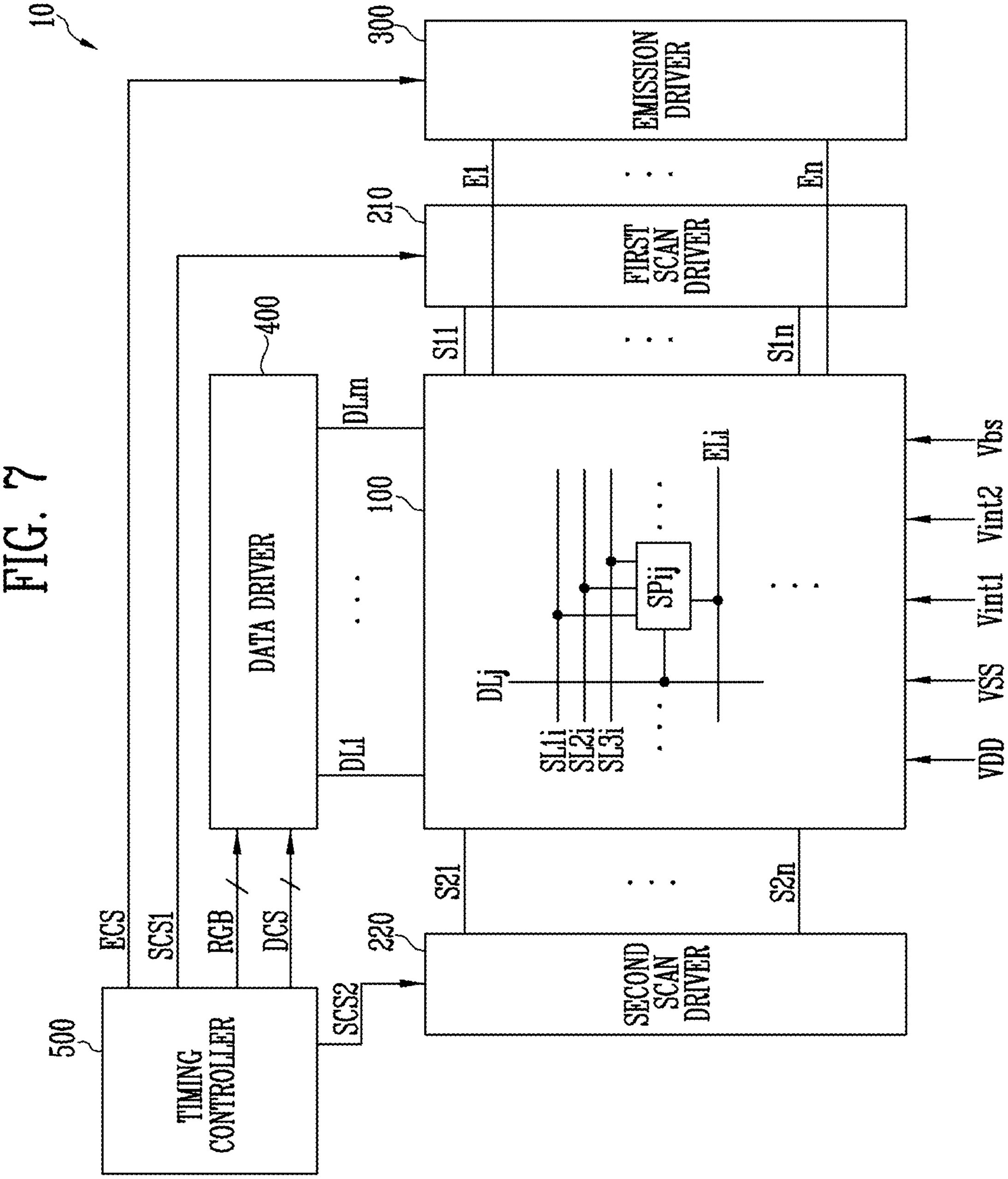
FIG. 7 illustrates a display device according to embodiments of the present disclosure.

FIG. 7 illustrates a display device according to embodiments of the present disclosure.

Referring to FIG. 1 and FIG. 7, the scan driver 200 may include a first scan driver 210 and a second scan driver 220. The display panel 100, the emission driver 300, and the data driver 400 of FIG. 1 are similar to the display panel 100, the emission driver 300, and the data driver 400 of FIG. 7, so duplicate descriptions may be omitted.

The timing controller 500 may generate a first scan control signal SCS1 and a second scan control signal SCS2.

The first scan control signal SCS1 may be supplied to the first scan driver 210, and the second scan control signal SCS2 may be supplied to the second scan driver 220.

The first scan control signal SCS1 may include a first scan start pulse and clock signals. The first scan start pulse may control a first timing of the scan signal output from the first scan driver 210. The clock signals may be used to shift the first scan start pulse.

The second scan control signal SCS2 may include a second scan start pulse and clock signals. The second scan start pulse may control a first timing of the scan signal output from the second scan driver 220. The clock signals may be used to shift the second scan start pulse.

The first scan driver 210 may receive the first scan control signal SCS1 from the timing controller 500 and supply a scan signal (for example, a first scan signal) to the first scan lines S11 to S1*n* based on the first scan control signal SCS1.

For example, the first scan driver 210 may sequentially supply the first scan signal to the first scan lines S11 to S1*n*. The transistor included in the sub-pixel SP and receiving the first scan signal may be set to a turn-on state when the first scan signal is supplied.

Referring to FIG. 5 and FIG. 6, the second and third transistors M2 and M3 may be set to a turn-on state when the i-th first scan signal is supplied, and the fourth transistor M4 may be set to a turn-on state when the (i−1)-th first scan signal is supplied.

The second scan driver 220 may receive the second scan control signal SCS2 from the timing controller 500 and supply a scan signal (for example, a second scan signal) to the second scan lines S21 to S2*n* based on the second scan control signal SCS2.

For example, the second scan driver 220 may sequentially supply the second scan signal to the second scan lines S21 to S2*n*.

Referring to FIG. 5 and FIG. 6, the seventh and eighth transistors M7 and M8 may be set to a turn-on state when the i-th second scan signal is supplied.

That is, the second to fourth transistors M2 to M4 may be integrated and controlled by a first scan driver 210, rather than being individually controlled by separate scan drivers.

Accordingly, the number of required scan drivers is reduced, so that the non-display area in which the scan driver is disposed may be reduced.

In addition, referring to FIG. 7, it is shown that the first scan driver 210 is disposed on a side of the display panel 100 and the second scan driver 220 is disposed on the other side of the display panel 100, but the present disclosure is not limited thereto, and they may be variously disposed according to embodiments. For example, the first scan driver 210 outputting the first scan signal may be disposed on both sides of the display panel 100.

Figure 8:
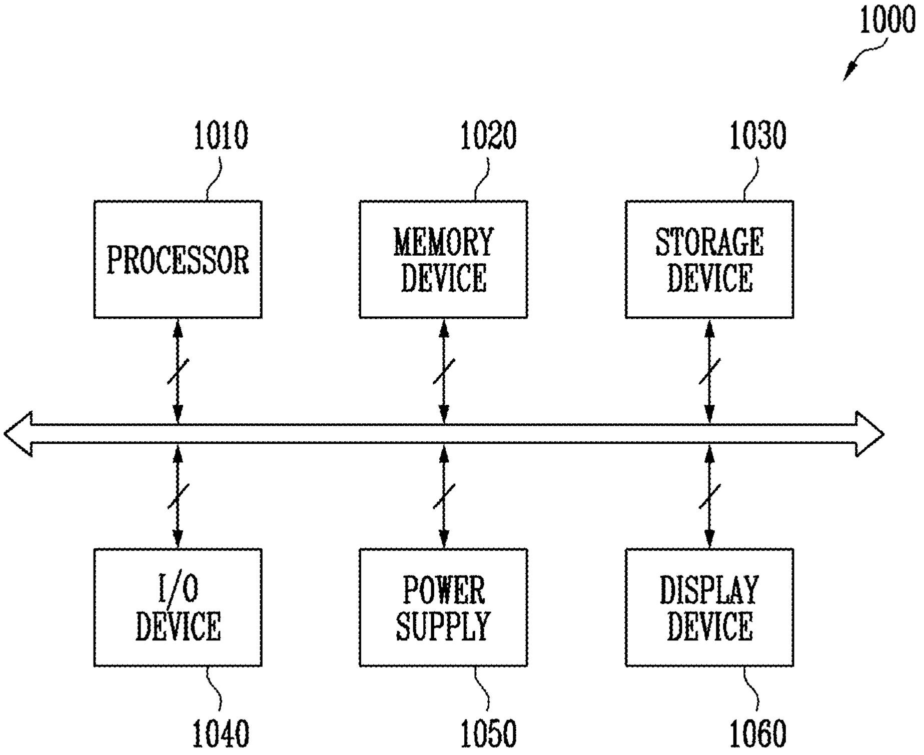
FIG. 8 is a block diagram that illustrates an electronic device according to embodiments of the present disclosure.
Figure 9:
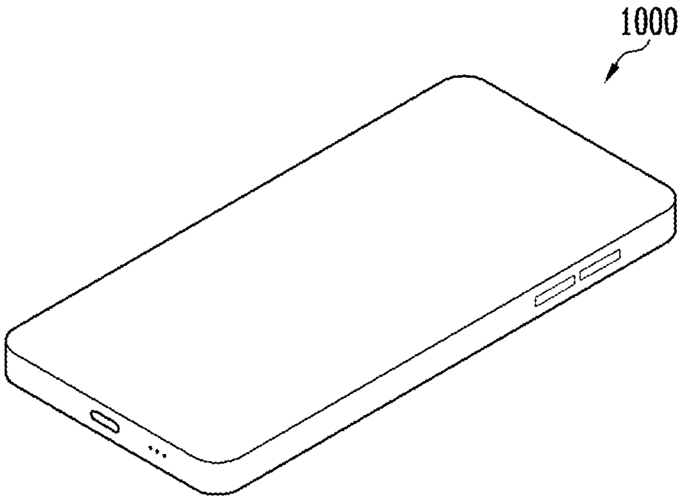
FIG. 9 illustrates an example in which the electronic device of FIG. 8 is implemented as a smart phone.

FIG. 8 is a block diagram that illustrates an electronic device according to embodiments of the present disclosure, and FIG. 9 illustrates an example in which the electronic device of FIG. 8 is implemented as a smart phone.

Referring to FIG. 8 and FIG. 9, an electronic device 1000 may include a processor 1010, a memory device 1020, a storage device 1030, an input/output device 1040, a power supply 1050, and a display device 1060. In this case, the display device 1060 may be the display device of FIG. 1. In addition, the electronic device 1000 may further include several ports capable of communicating with a video card, a sound card, a memory card, a USB device, and the like, or communicating with other systems. In the embodiment, as shown in FIG. 9, the electronic device 1000 may be implemented as a smart phone. However, this is an example, and the electronic device 1000 is not limited thereto. For example, the electronic device 1000 may be implemented as a mobile phone, a video phone, a smart pad, a smart watch, a tablet PC, a vehicle navigation, a computer monitor, a laptop, a head mounted display device, or the like.

The processor 1010 may perform specific calculations or tasks. In some embodiments, the processor 1010 may be a microprocessor, a central processing unit, an application processor, or the like. The processor 1010 may be connected to other constituent elements through an address bus, a control bus, and a data bus. In some embodiments, the processor 1010 may also be connected to an extension bus such as a peripheral component interconnect (PCI) bus.

The memory device 1020 may store data necessary for operations of the electronic device 1000. For example, the memory device 1020 may include non-volatile memory devices such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, and a ferroelectric random access memory (FRAM) device, or volatile memory devices such as a dynamic random access memory (DRAM) device, a static random access memory (SRAM) device, and a mobile DRAM device.

The storage device 1030 may include a solid state drive (SSD), a hard disk drive (HDD), a CD-ROM, and the like.

The input/output device 1040 may include input devices such as a keyboard, a keypad, a touch pad, a touchscreen, mouse, and the like, and output devices such as a speaker, a printer, and the like. In some embodiments, the display device 1060 may be included in the input/output device 1040.

The power supply 1050 may supply power necessary for the operation of the electronic device 1000. For example, the power supply 1050 may be a power management integrated circuit (PMIC).

The display device 1060 may display an image corresponding to visual information of the electronic device 1000. In this case, the display device 1060 may be an organic light emitting display device or a quantum dot light emitting display device, but is not limited thereto. The display device 1060 may be connected to other constituent elements through the buses or other communication links.

While the present disclosure has been described with reference to embodiments thereof, it will be apparent to those of ordinary skill in the art that various changes and modifications may be made thereto without departing from the scope and spirit of the present disclosure as set forth in the following claims.

What is claimed is:

1. A sub-pixel comprising:
   - a first transistor that is connected between a first node that receives a first driving power and a second node to generate a driving current and includes a control electrode connected to a third node;
   - a second transistor connected between a data line and the first node and turned on in response to a first scan signal;
   - a third transistor connected between the second node and the third node and turned on in response to the first scan signal;
   - a fourth transistor connected between the third node and a first power line providing a first initialization power and turned on in response to a second scan signal;
   - a seventh transistor connected between a fourth node and a fourth power line that provides a voltage of a second initialization power and turned on in response to a third scan signal;

an eighth transistor connected between the first node and a fifth power line that provides a voltage of a bias power and turned on in response to the third scan signal; and a light emitting element that receives the driving current to emit light.

2. The sub-pixel of claim 1, wherein each of the second transistor and the third transistor is an NMOS transistor.

3. The sub-pixel of claim 1, further comprising a fifth transistor connected between the first node and a second power line that provides a voltage of the first driving power and turned on in response to an emission control signal; and a sixth transistor connected between the second node and the fourth node and turned on in response to the emission control signal, wherein the light emitting element is connected between the fourth node and a third power line that provides a second driving power.

4. The sub-pixel of claim 1, wherein each of the second transistor, the third transistor, and the fourth transistor is an NMOS transistor, and each of the first transistor, the fifth transistor, the sixth transistor, the seventh transistor, and the eighth transistor is a PMOS transistor.

5. The sub-pixel of claim 1, wherein in operation, a frame includes a non-emission period and an emission period;

the non-emission period includes a first period, a second period, and a third period;

in the first period, the second scan signal has a high logic level;

in the second period after the first period, the first scan signal has the high logic level; and in the third period after the second period, the third scan signal has a low logic level.

6. A display device comprising:

a sub-pixel that includes a first transistor and a light emitting element, the first transistor is connected between a first node that receives a first driving power and a second node to generate a driving current, the first transistor includes a control electrode connected to a third node, the sub-pixel is connected to a first scan line, an emission control line, and a data line;

an emission driver supplying an emission control signal to the emission control line;

a first scan driver supplying a first scan signal to the first scan line;

a second scan driver that supplies a second scan signal to the second scan line;

a third scan driver that supplies a third scan signal to a third scan line; and a data driver supplying a data signal to the data line, wherein the first scan signal controls a timing at which the data signal is supplied to the first node and a timing at which the second node and the third node are connected, the sub-pixel further includes a second transistor connected between the data line and the first node and turned on in response to the first scan signal;

a third transistor connected between the second node and the third node and turned on in response to the first scan signal;

a fourth transistor connected between the third node and a first power line that provides a first initialization power and turned on in response to the second scan signal;

a seventh transistor connected between a fourth node and a fourth power line that provides a voltage of a second initialization power and turned on in response to the third scan signal;

an eighth transistor connected between the first node and a fifth power line that provides a voltage of a bias power and turned on in response to the third scan signal; and the light emitting element that receives the driving current to emit light.

7. The display device of claim 6, wherein each of the second transistor and the third transistor is an NMOS transistor.

8. The display device of claim 6, wherein the sub-pixel further includes a fifth transistor connected between the first node and a second power line that provides a voltage of the first driving power and turned on in response to the emission control signal; and a sixth transistor connected between the second node and the fourth node and turned on in response to the emission control signal, and the light emitting element is connected between the fourth node and a third power line that provides a second driving power.

9. The display device of claim 6, wherein each of the second transistor, the third transistor, and the fourth transistor is an NMOS transistor, and each of the first transistor, the fifth transistor, the sixth transistor, the seventh transistor, and the eighth transistor is a PMOS transistor.

10. An electronic device comprising:

a processor to provide input image data; and a display device to display an image based on the input image data, wherein the display device comprising:

a sub-pixel that includes a first transistor and a light emitting element, the first transistor is connected between a first node that receives a first driving power and a second node to generate a driving current, the first transistor includes a control electrode connected to a third node, the sub-pixel is connected to an i-th first scan line, an (i-1)-th first scan line, an i-th emission control line, and a j-th data line;

an emission driver that supplies an i-th emission control signal to the i-th emission control line;

a first scan driver that supplies an i-th first scan signal to the i-th first scan line and an (i-1)-th first scan signal to the (i-1)-th first scan line;

a second scan driver that supplies an i-th second scan signal to an i-th second scan line; and a data driver that supplies a data signal to the j-th data line, wherein the i-th first scan signal controls a timing at which the data signal is supplied to the first node and a timing at which the second node and the third node are connected, and i and j are natural numbers, the sub-pixel further includes a second transistor connected between the j-th data line and the first node and turned on in response to the i-th first scan signal;

a third transistor connected between the second node and the third node and turned on in response to the i-th first scan signal;

a fourth transistor connected between the third node and a first power line that provides a first initialization power and turned on in response to the (i-1)-th first scan signal;

a seventh transistor connected between a fourth node and a fourth power line that provides a voltage of a second initialization power and turned on in response to the i-th second scan signal; and an eighth transistor connected between the first node and a fifth power line that provides a voltage of a bias power and turned on in response to the i-th second scan signal; and the light emitting element that receives the driving current to emit light.

11. The electronic device of claim 10, wherein the sub-pixel further includes a fifth transistor connected between the first node and a second power line that provides a voltage of the first driving power and turned on in response to the i-th emission control signal; and a sixth transistor connected between the second node and the fourth node and turned on in response to the i-th emission control signal, and the light emitting element is connected between the fourth node and a third power line that provides a second driving power.

12. The electronic device of claim 10, wherein each of the second transistor, the third transistor, and the fourth transistor is an NMOS transistor, and each of the first transistor, the fifth transistor, the sixth transistor, the seventh transistor, and the eighth transistor is a PMOS transistor.

* * * * *